Jan. 8, 1924. 1,480,125
W. A. STONE
COTTON PICKER
Filed June 9, 1921 2 Sheets-Sheet 1
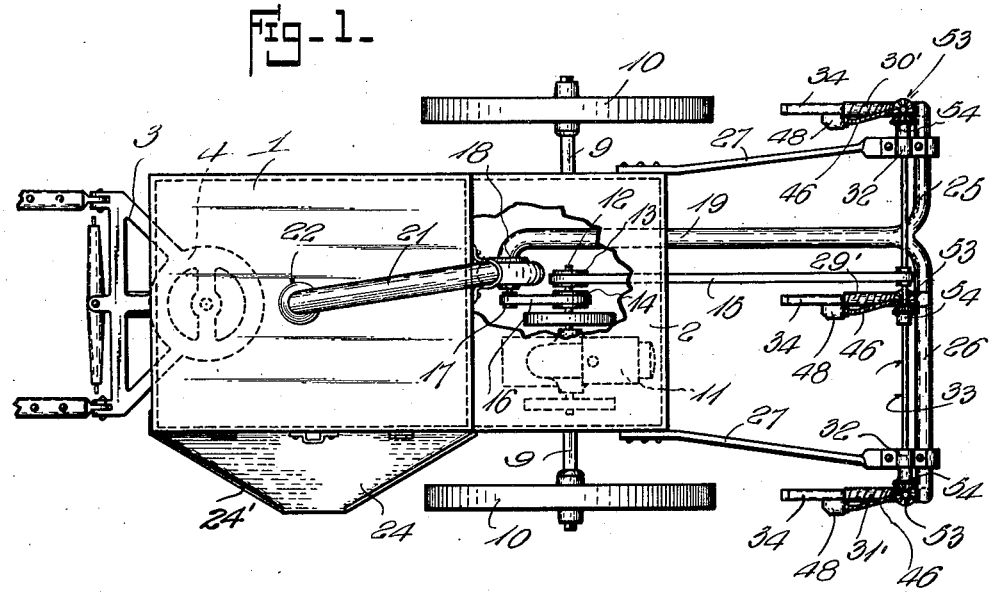
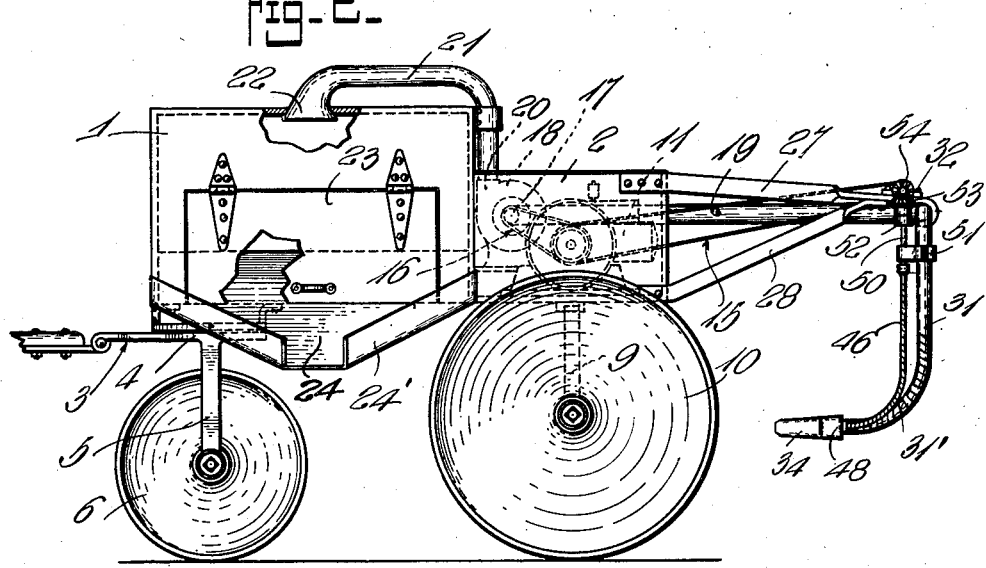
Inventor
W. A. Stone
by H. B. Willson & Co. Attorneys Jan. 8, 1924.　　　　　　　　　　　　　　1,480,125
W. A. STONE
COTTON PICKER
Filed June 9, 1921　　　　2 Sheets-Sheet 2
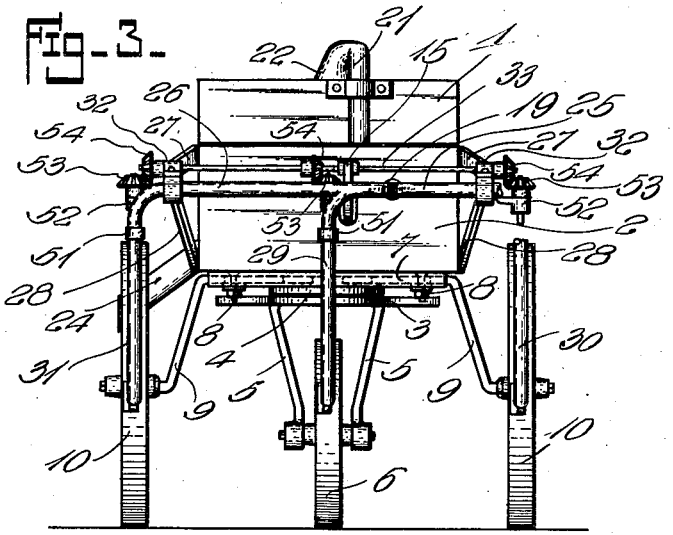
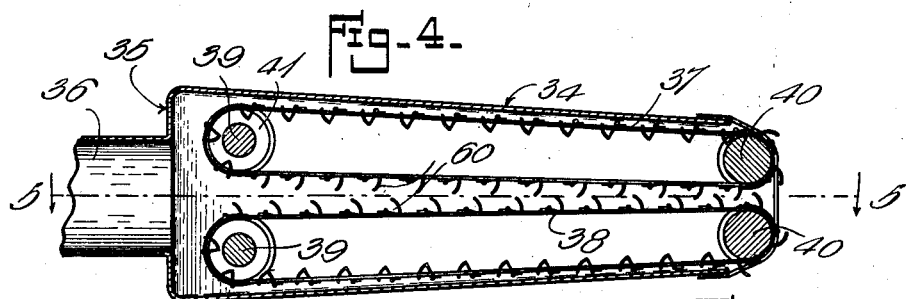
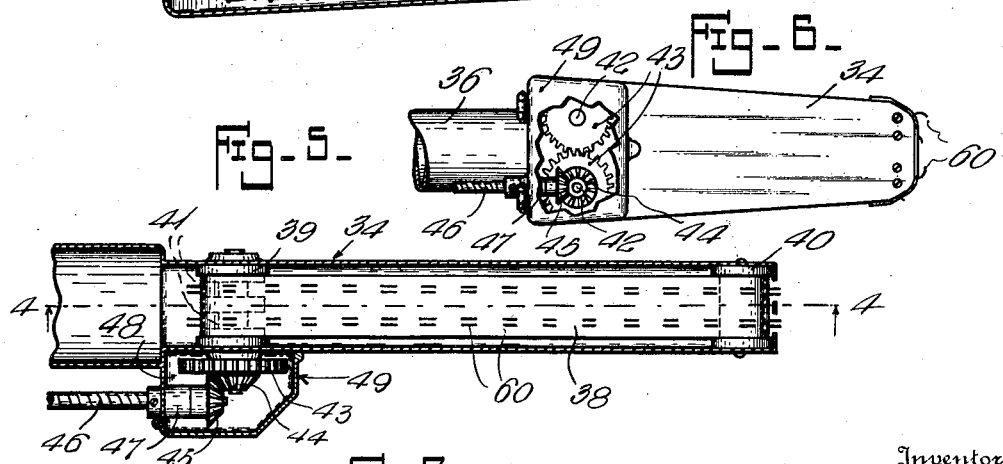
Inventor
W. A. Stone
by H. B. Willson & Co.
Attorneys Patented Jan. 8, 1924.

1,480,125

UNITED STATES PATENT OFFICE.

WALTER A. STONE, OF MEMPHIS, TENNESSEE.

COTTON PICKER.

Application filed June 9, 1921. Serial No. 476,293.

*To all whom it may concern:*

Be it known that I, WALTER A. STONE, a citizen of the United States, residing at Memphis, in the county of Shelby and State of Tennessee, have invented certain new and useful Improvements in Cotton Pickers; and I do declare the following to be a full, clear, and exact description of the invention, such as will enable others skilled in the art to which it appertains to make and use the same.

This invention relates to an improved cotton picker and one object of the invention is to provide a cotton picker of the suction type in which the cotton picker is provided with an improved type of nozzle through which the cotton will pass.

Another object of the invention is to so construct these nozzles that endless conveyers having hooking elements carried thereby may be mounted in the nozzles so that the hooks will engage the cotton and draw the same into the nozzles, the conveyers extending in diverging relation so that the cotton will be easily released from the hooks and drawn through the conveyer pipes.

Another object of the invention is to so mount the hooks that they may readily move through slots in the conveyer belts to an operative or an inoperative position.

Another object of the invention is to so construct this machine that it may straddle two rows of cotton plants thus permitting cotton to be picked from the plants of both rows as the machine moves across a field.

Another object of the invention is to so construct the machine that the rear supporting wheels may be adjusted according to the width of the rows.

Another object of the invention is to provide a machine which will be very compact and will have a strong and durable frame structure.

Another object of the invention is to so construct this cotton picker that the fan and actuating motor for the fan and power shaft of the endless conveyers in the nozzles may be mounted in a compartment forming the rear portion of the body of the picker above the rear supporting axle and to the rear of the compartment for receiving the cotton thus placing the heaviest portion of the machine directly above the main supporting axle.

This invention is illustrated in the accompanying drawings, wherein:

Figure 1 is a view showing the improved cotton picking machine in top plan, the upper wall of the motor carrying compartment being partially broken away.

Figure 2 is a view showing the improved machine in side elevation with a portion of the cotton receiving compartment broken away.

Figure 3 is a view showing the improved machine in rear elevation.

Figure 4 is an enlarged longitudinal sectional view through one of the nozzles taken along the line 4—4 of Fig. 5.

Figure 5 is a longitudinal sectional view through the nozzle taken along the line 5—5 of Fig. 4.

Figure 6 is a somewhat smaller view of the nozzle showing the same in side elevation, the gear housing thereof being partially broken away to disclose the gears within the gear housing.

Figure 7 is an enlarged perspective view showing a fragment of one of the conveyer belts and the cotton engaging hooks carried thereby.

This improved cotton picker is provided with a body having a forward compartment 1 and a rear compartment 2, the forward compartment being the compartment for receiving the cotton and the rear compartment which is of less height than the forward compartment being the compartment in which the fan and operating motor are mounted. The forward compartment is supported upon a truck 3 which is pivotally mounted through the medium of a fifth wheel structure 4 and carries the draft appliances as shown in Figs. 1 and 2 and also carries forks 5 between which the front roller or supporting wheel 6 is mounted. The rear compartment carries a sleeve 7 which extends transversely of the body and is provided adjacent its ends with fasteners 8 for engaging the shanks of the axle members 9 which together with the sleeve 7 forms a substantially U-shaped axle having end spindles upon which the rear supporting wheels 10 are mounted. It will thus be seen that the rear axle may be adjusted for length and the rear wheels may be set apart the desired distance so that the rear axle may straddle two rows of cotton plants with the cotton plants positioned in the space between the front wheel 6 and the two rear wheels 10. These wheels 6 and 10 are of a solid spoke construction so that there will be no danger of the plants catching in the wheels as the machine moves across a field.

A motor 11 of the internal combustion type is mounted in the rear compartment 2 and is provided with an extended shaft 12 upon which will be mounted pulley wheels 13 and 14 about which will pass belts 15 and 16, the belt 16 passing about the pulley wheel 17 of a rotary fan 18. This fan 18 is of a conventional construction and is provided with an inlet from which extends a pipe 19 and an outlet 20 from which extends a pipe 21. This pipe 21 leads forwardly above the compartment 1 and terminates in a flared nozzle 22 which extends through the top of the compartment 1 into the compartment. It will thus be seen that cotton which passes from the fan through the pipe 21 will pass into the compartment 1 where it will be retained until the door 23 is opened to permit the cotton to pass out of the compartment 1 and along the tray or chute 24, the converging flanges 24' of which guide the cotton into a suitable receptacle.

The pipe 19 which constitutes the conductor pipe through which the cotton will pass to the fan 18 extends rearwardly of the body and is provided with branch pipes 25 and 26 which extend outwardly towards the sides of the machine and are supported in bearings formed by bending the rear end portions of the supporting bars 27 which are secured to the sides of the housing 2 and are braced by bracing bars 28. The branch pipe 26 is provided with a branch pipe 29 and the pipes 25 and 26 have their end portions turned down, the depending end portions 30 and 31 of the pipes 25 and 26 and the branch pipe 29 terminating in flexible pipes as shown at 29', 30' and 31' in Figs. 1 and 2, so that the end portions of these pipes may be moved as desired. In addition to carrying the branch pipes 25 and 26, the side arms 27 carry bearings 32 in which a driving shaft 33 is rotatably mounted.

In order to gather the cotton from the plants, each of the pipes have been provided with a nozzle 34 enlarged views of which are shown in Figs. 4, 5 and 6. From an inspection of Figs. 4, 5 and 6, it will be seen that each of the nozzles is tapered longitudinally from its inner end to its outer end, the outer end being open to provide with an inlet and the inner end having a head 35 provided with an outlet from which extends a neck 36 upon which will fit the flexible end portion of the collecting pipe carrying the nozzle. Upper and lower endless conveyers or belts 37 and 38 are mounted in the nozzle and each is provided with an inner roller 39 and an outer or forward roller 40, the inner roller 39 being cut to provide grooves 41 and the inner roller having shaft extensions 42 upon which will be mounted gears 43 so that rotary movement can be transmitted from the roller 39 of the lower conveyer to the rollers 39 of the upper conveyer. The shaft extension of the roller 39 of the lower conveyer in addition to carrying the gear 43 also carries a bevel gear 44 which is engaged by a pinion 45 carried by the flexible shaft 46 which is journalled in the bearing 47 carried by the housing 48 in which the gearing is mounted. This housing has a door 49 which may be opened when access to the gearing is desired. The flexible shafts 46 form extensions of short driven shafts 50 which are mounted in bearings 51 and 52 and carry bevel gears or pinions 53 which mesh with bevel gears or pinions 54 carried by the shaft 33. It will thus be seen that the driving shaft which is rotated from the motor through the medium of the belt 16 serves as a driving shaft for imparting movement to the endless conveyer belts 37 and 38. These belts extend inwardly in diverging relation as clearly shown in Fig. 4 so that the cotton will be readily released from the conveyer belts and may be sucked through the pipes 29, 30 and 31 and from these pipes into the conductor pipe 19 to the fan 18 from which the cotton will pass through the pipe 21 into the cotton receptacle 1.

When the device is in use, it is desired to have the conveyer or picker belts as they may be termed, grasp the cotton and drag the same from the plants. In order to do so, each of the belts has been provided with cotton engaging hooks which will be constructed as shown in Fig. 7. Each of the belts is provided with slots 55 and bearing brackets 56 are secured to the belts adjacent the slots. The hooks which are arranged in double row as shown in Fig. 5 will each be formed from a strand of relatively heavy wire bent to provide a cross bar which is mounted in the bearings 57 of the bearing brackets 56. Between the bearings 57, the cross bar is bent to provide an abutment finger 58 and the end portions of the strand are bent to provide shanks 59 having bills 60 at their free ends. The hooks can thus move through the slots from an operative to an inoperative position, the inner rollers 39 being slotted as previously stated so that the hooks may move inwardly to an inoperative position and the outer rollers 40 being of a solid construction so that they will engage the shanks of the hooks and force the hooks outwardly to an operative position.

When this machine is in use, the wheels 10 will be set the proper distance apart by adjustment of the rear axle so that the axle may straddle two rows with the plants positioned between the wheel 6 and the wheels 10. The draft animals will be connected with the draft appliance of the truck 3 and the driver will occupy the forward portion of the compartment 1 and direct movement of the machine across a field. As the machine moves across the field with the motor in operation to operate the fan and belts carried by the nozzles, the operators will follow the machine and will bring the outer ends of the nozzles into engagement with the pods of cotton which have opened a sufficient amount to warrant picking of the cotton. One operator will walk between the rows and the two remaining operators who will handle the pipes 30 and 31, will walk along the outer sides of the rows. When the end portion of the nozzle is brought into engagement with a pod of cotton the hooks which are in the extended position as shown in Figs. 4 and 6 will engage the cotton and draw the same from the plant. The cotton which is engaged by the hooks will thus be carried inwardly into the nozzle between the belts and as the belts move inwardly, the hooks will be gradually moved away from each other as the belts diverge. This will cause the cotton to be freed from the hooks to a sufficient extent to permit the suction of air through the nozzles to draw the cotton through the branch pipe and into the main conductor pipe 19 through which it will pass into the fan housing and from the fan housing through the pipe 21 into the cotton receptacle 1. When the cotton receptacle is filled, it is simply necessary to open the door 23 and the picked cotton will pass through the outlet down the tray or chute 24 and into a receptacle positioned beneath the chute. It will thus be seen that the cotton will be hooked from the plants and thus positively drawn into the nozzles of the pipes and when within the nozzles will be freed from the hooks and drawn into the pipe 19 by air sucked through this pipe. It will be further noted that only cotton which has opened can be picked by means of this machine and that this opened cotton can be very easily and quickly removed from the plants. It will be further noted that since the axle is adjustable longitudinally, the machine can be adjusted to accommodate itself to the distance between the rows of plants and further that since the wheels are of the disk type, there will be no danger of the plants catching in the wheels and thus being damaged.

What is claimed is:

1. A cotton picker nozzle including a housing open at its ends to provide an inlet and an outlet, slotted conveyor belts extending longitudinally in said housing from the inlet, inner and outer rollers for said conveyors, the inner rollers having annular grooves and the outer rollers being solid, and cotton engaging hooks pivotally connected with said belts and projected through said slots when in engagement with said outer rollers and passing through the grooves of the inner rollers when in a retracted inoperative position.

2. A cotton picker nozzle including a housing open at its ends to provide an inlet and an outlet, conveyor belts movably mounted in said housing and extending longitudinally from the inlet in spaced relation and each having longitudinally extended rows of cotton engaging hooks, each hook being formed from a strand of wire bent to provide a cross bar crimped intermediate its length to provide an abutment finger, shanks extending from the ends of the cross bar and having their end portions bent to provide bills, and a bearing plate connected with the belts and having spurs engaging the cross bar upon opposite sides of the abutment finger to pivotally mount the hooks, the belts being provided with slots in operative relation to the shanks of the hooks whereby the hooks may have movement through the belts.

In testimony whereof I have hereunto set my hand.

WALTER A. STONE.